May 1, 1956  F. V. HART  2,743,802
CLUTCHES

Filed Jan. 7, 1953  2 Sheets-Sheet 1

Inventor
Fred V. Hart
By his Attorney

May 1, 1956

F. V. HART 2,743,802

CLUTCHES

Filed Jan. 7, 1953

Inventor
Fred V. Hart
By his Attorney

United States Patent Office 2,743,802
Patented May 1, 1956

---

2,743,802

CLUTCHES

Fred V. Hart, Marblehead, Mass., assignor to United Shoe Machinery Corporation, Flemington, N. J., a corporation of New Jersey Application January 7, 1953, Serial No. 329,943

9 Claims. (Cl. 192—27)

This invention relates to clutches and more particularly to clutch mechanism in which a driven member is automatically disconnected from a drive member after a predetermined amount of rotation of the drive member. The invention is illustrated as embodied in a clutch of the so-called Horton or roll type.

An object of the invention is to provide an improved roll type clutch having means to insure the complete disengagement of the drive and driven members regardless of the rate of rotation of the drive member. To this end and in accordance with a feature of the invention, the position of the drive roll of the clutch is controlled by a roll carrier rotatable with the driven member and normally urged into a position relatively thereto in which the roll connects the drive and driven members, there being means arranged to move the roll carrier in a reverse direction at the completion of a predetermined amount of rotation of the drive member thereby to carry the roll out of driving engagement with the drive member. Thus the disengagement of the roll is not dependent upon the momentum of the driven member so that complete disengagement of the roll with the drive member is insured even though the drive member is turning at a very low rate of speed.

In accordance with a further feature of the invention means are provided for locking the driven member against turning movement in either direction upon movement of the drive roll out of driving engagement with the drive member.

The above and other features of the invention including various details of construction and novel combinations of parts will now be described by reference to the drawings and pointed out in the claims.

Figure 2:
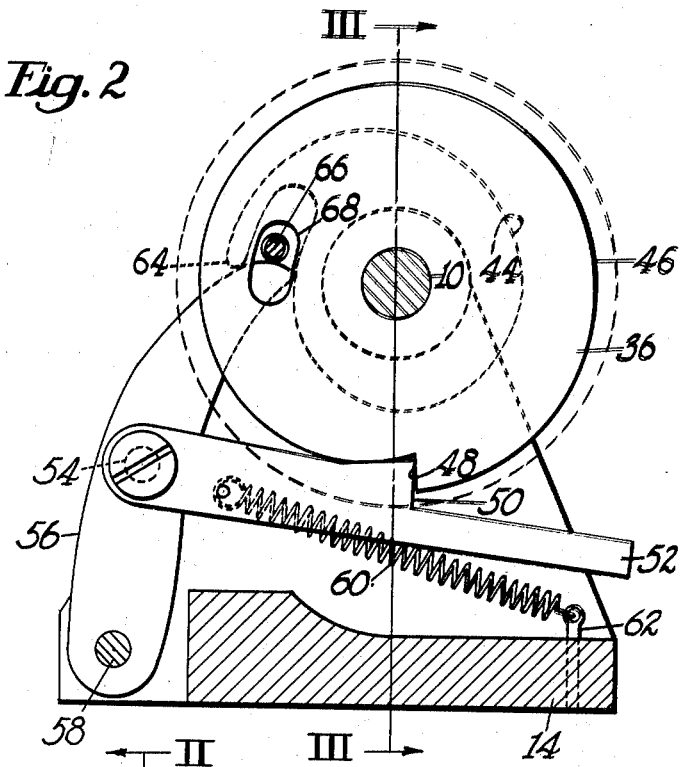
Fig. 2 is a section on the line II—II of Fig. 1.
Figure 1:
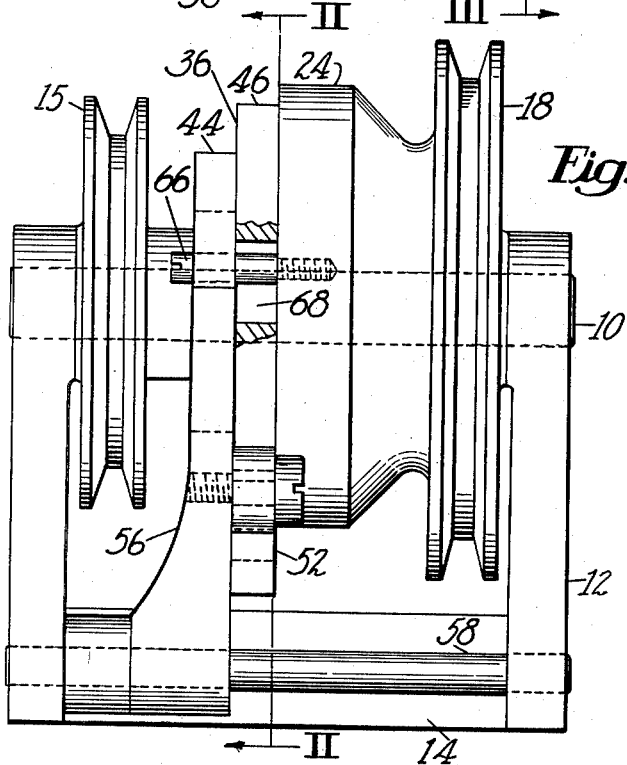
Fig. 1 is a front elevation partly in section of a clutch assembly in which the invention is embodied.

The clutch assembly includes a shaft 10 journaled in the upper ends of arms 12 carried by a base 14. The shaft 10 is arranged to be driven when the clutch members are engaged and has secured to it a pulley 15 which may be connected by a belt 16 to any suitable driven member. A constantly rotating drive pulley 18 is journaled on a bushing 20 surrounding the shaft 10 and receives power from a drive member through a belt 22.

Figure 4:
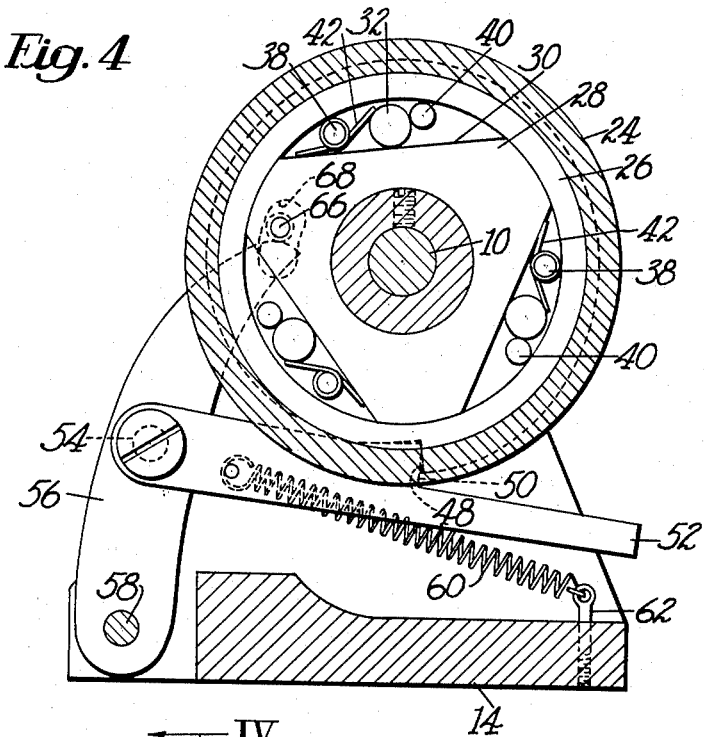
Fig. 4 is a section on the line IV—IV of Fig. 3.
Figure 3:
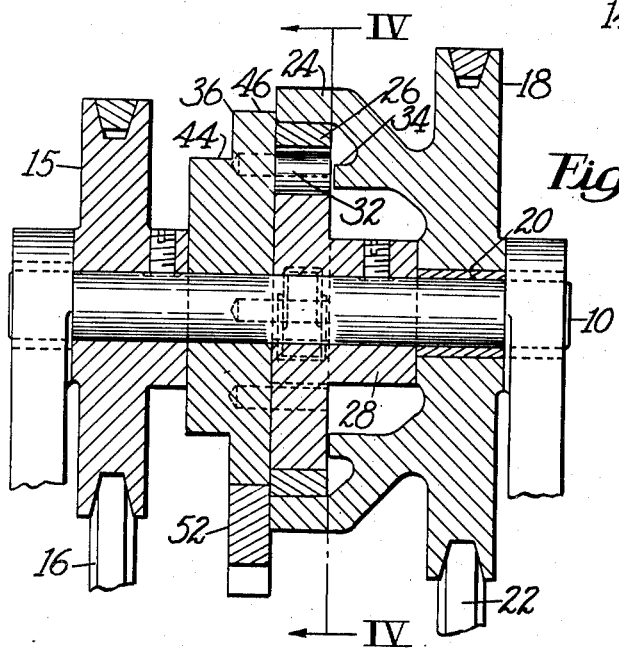
Fig. 3 is a section on the line III—III of Fig. 2.

Extending laterally from, and integral with the pulley 18 is a cylindrical flange 24 into which is pressed a hardened steel ring 26 which forms, with the pulley, the drive member of the clutch. Secured to the shaft 10 is a driven member 28 which, as shown in Fig. 4, is generally triangular in shape providing three flat surfaces 30 to which power is transmitted from the ring 26 by means of rolls 32. These rolls are somewhat smaller in diameter than the maximum spacing between the flat surfaces 30 of the driven member 28 and the inner surface of the steel ring 26 so that with the rolls held in the positions shown in Fig. 4, no driving force is transmitted from the pulley to the driven member 28.

The rolls are held between a flange 34 integral with the pulley 18 and a roll retaining member 36 which is loose on the shaft 10 and is located between the driven member 28 and the driven pulley 15. The roll retaining member 36 carries three sets of pins 38, 40 extending laterally from the roll retainer into the spaces formed between the ring 26 of the drive member and the flat surfaces 30 of the driven member 28. A spring 42 is carried by each pin 38 and has an end acting on the associated roll 32 to urge it toward the pin 40. The other end of each spring 42 bears against the adjacent flat surface of the driven member 28, exerting a force tending to rotate the roll retaining member 36 in a clockwise direction, as viewed in Fig. 4, relative to the driven member 28 whereupon the rolls 32 move into driving relationship with the driving member 26 if the roll retaining member is free to turn.

The roll retainer 36 has formed thereon a cam 44 (Fig. 2) and a cam 46. The cam 46 has a shoulder 48 engaged by a shoulder 50 of a control arm 52 with the parts in the positions shown in Fig. 2 and the clutch disengaged. Thus the roll retainer is locked against clockwise movement and the springs 42 are ineffective to cause driving engagement of the rolls 32 with the ring 26 of the pulley 18 inasmuch as such driving engagement can only be effected by turning the roll retaining member 36 carrying the pins 40 in a clockwise direction as viewed in Fig. 4.

The control arm 52 is pivoted at 54 on a lever 56 which is in turn pivoted at 58 in the base plate 14. A spring 60 is connected to the control arm 52 and to a retaining member 62 in the base plate 14 thereby urging the lever 56 in a clockwise direction with its upper end in contact with the cam 44. This cam has a drop-off portion 64 the function of which will appear as the description proceeds. Carried by the driven member 28 is a pin 66 extending through a slot 68 in the roll retainer 36 and arranged, with the parts in the positions shown in Fig. 2, in which the clutch is disengaged, to engage the upper end of the lever 56. This prevents accidental movement of the driven member 28 in a counterclockwise direction with the clutch disengaged and clockwise movement thereof is prevented by engagement of the shoulder 50 of the control arm 52 with the shoulder 48 of the cam 46, which prevents clockwise movement of the roll retainer 36. The rolls 32, held by the springs 42 against the pins 40 and the surfaces 30 of the driven member prevent the driven member from turning clockwise relative to the roll retainer 36. Consequently, the driven member is held against rotation in either direction.

To cause engagement of the clutch parts, the control arm 52 is moved downwardly moving its shoulder 50 out of engagement with the shoulder 48 of the roll retainer 36 whereupon the springs 42 act to turn the roll retainer slightly in a clockwise direction or until the rolls 32 are wedged between the ring 26 and the flat surfaces 30 of the driven member. The member 28 now begins to rotate, and with it the roll retainer 36. During this rotation the cam 44 acts upon the lever 56 to move it in a counterclockwise direction as viewed in Fig. 2. This causes the control arm 52 to move to the left against the action of the spring 60 and this action continues until the parts approach the positions shown in Fig. 2. At the conclusion of one revolution of the shaft 10 the lever 56 drops off the shoulder 64 whereupon the spring 60 moves the control arm 52 to the right, its shoulder engaging the shoulder 48 of the cam 46 imparting a blow thereto causing counterclockwise movement of the roll retainer 36, whereupon the pins 40 (Fig. 4) move the rolls 32 with the roll retainer into the positions illustrated against the force of the springs 42, thus freeing the driven member from the drive pulley. Retrograde movement of the driven member 28 at this time is prevented by engagement of the pin 66 with the upper end of the lever 56.

The speed of rotation of the drive pulley 18 is entirely immaterial and does not affect the proper operation of the clutch since the momentum of the parts is not relied upon to move the roll retainer to carry the drive rolls out of engagement with the drive pulley. The force required to cause proper disengagement of the parts is stored in the spring 60 and is available at the completion of a revolution of the driven member to effect the disengagement and bring the driven member immediately to rest.

Thus it will be seen that the clutch is equally effective for any speed of operation of the drive member and danger of undue wearing of the parts because of inadequate disengagement thereof due to lack of sufficient momentum because of a low speed of rotation, is eliminated.

Having thus described my invention, what I claim as new and desire to secure by Letters Patent of the United States is:

1. A roll type clutch comprising a drive member, a driven member, a roll for connecting said drive and driven members, a roll carrier for moving said roll into and out of driving position and arranged to turn with said driving and driven members, means acting on said roll carrier to turn it in a direction to move said roll into driving position, and means operative automatically at a predetermined time in the rotation of said roll carrier for imparting a blow to the roll carrier to move it in a direction opposite to the direction of rotation of said driven member to carry the roll out of driving position.

2. A roll type clutch comprising a drive member, a driven member, a roll for connecting said drive and driven members, a roll carrier for moving said roll into and out of driving position and arranged to turn with said driving and driven members, means acting on said roll carrier to turn it in a direction to move said roll into driving position, means operative automatically at a predetermined time in the rotation of said roll carrier for imparting a blow to the roll carrier to move it in a direction opposite to the direction of rotation of said driven member to carry the roll out of driving position, and means associated with said last-named means for locking said driven member against continued rotation.

3. A roll type clutch comprising a drive member, a driven member, a roll for connecting said drive and driven members, a roll carrier for moving said roll into and out of driving position and arranged to turn with said driving and driven members, means acting on said roll carrier to turn it in a direction to move said roll into driving position, means operative automatically at a predetermined time in the rotation of said roll carrier for imparting a blow to the roll carrier to move it in a direction opposite to the direction of rotation of said driven member to carry the roll out of driving position, and means for preventing turning of the driven member in either direction with the roll carrier moved into a position in which the roll is out of driving engagement with the drive member.

4. A roll type clutch comprising a drive member, a driven member, a roll arranged when in a predetermined position relative to said driven member to connect said drive and driven members for conjoint rotation, a roll carrier for controlling the position of said roll relative to said driven member, means urging said roll carrier and roll into driving position, a spring-actuated member arranged upon its release to move said roll carrier and roll out of driving position, and means operative during rotation of said drive and driven members for activating said spring-actuated member and for releasing it at a predetermined time in the conjoint rotation of said drive and driven members.

5. A roll type clutch comprising a drive member, a driven member, a roll arranged when in a predetermined position relative to said driven member to connect said drive and driven members for conjoint rotation, a roll carrier for controlling the position of said roll relative to said driven member, means urging said roll carrier and roll into driving position, a spring-actuated member arranged upon its release to move said roll carrier and roll out of driving position, means operative during rotation of said drive and driven members for activating said spring-actuated member and for releasing it at a predetermined time in the conjoint rotation of said drive and driven members, and means associated with said last-named means for locking said driven member against continued rotation.

6. A roll type clutch comprising a drive member, a driven member, a roll arranged when in a predetermined position relative to said drive member to connect said drive and driven members for conjoint rotation, a roll carrier for controlling the position of said roll relative to said driven member, means urging said roll carrier and roll into driving position, a control arm arranged upon movement in one direction to move said roll carrier and roll out of driving position, said roll carrier having a shoulder in its periphery engaged by said control arm when the arm is moved in said one direction, a spring connected to said arm for moving the arm in said one direction, a lever on which said arm is carried, and a cam on said roll carrier acting on said lever to move the lever and the arm against the action of said spring and to release the lever and arm at a predetermined point in the rotation of said driven member.

7. A roll type clutch comprising a drive member, a driven member, a roll arranged when in a predetermined position relative to said drive member to connect said drive and driven members for conjoint rotation, a roll carrier for controlling the position of said roll relative to said driven member, means urging said roll carrier and roll into driving position, a control arm arranged upon movement in one direction to move said roll carrier and roll out of driving position, said roll carrier having a shoulder in its periphery engaged by said control arm when the arm is moved in said one direction, a spring connected to said arm for moving the arm in said one direction, a lever on which said arm is carried, a cam on said roll carrier acting on said lever to move the lever and the arm against the action of said spring and to release the lever and arm at a predetermined point in the rotation of said driven member, and means carried by said driven member cooperating with said lever to prevent reverse rotation of said driven member upon movement of said roll carrier and roll out of driving position.

8. A roll type clutch comprising a rotatable drive member having a circular internal drive surface, a driven member concentric with said drive member and having a flat surface forming a segmental space with the circular internal drive surface of said drive member, a drive roll within said space and arranged upon movement into a predetermined position relative to said flat surface to connect said drive member and said driven member for conjoint rotation, a roll carrier adjacent to said driven member and rotatable therewith, a pin carried by said roll carrier and extending into said segmental space ahead of said roll in the direction of rotation of said drive member whereby upon movement of the roll carrier in the reverse direction the roll is moved by said pin out of driving position, spring means associated with said roll carrier urging said roll toward said pin and urging the roll carrier in a direction to move the roll into driving position, and means operative at a predetermined point in the rotation of said drive member for moving said roll carrier in the reverse direction to disconnect the driven member from the drive member.

9. A roll type clutch comprising a rotatable drive member having a circular internal drive surface, a driven member concentric with said drive member and having a flat surface forming a segmental space with the circular internal drive surface of said drive member, a drive roll within said space and arranged upon movement into a predetermined position relative to said flat surface to connect said drive member and said driven member for conjoint rotation, a roll carrier adjacent to said driven member and rotatable therewith, a pin carried by said roll carrier and extending into said segmental space ahead of said roll in the direction of rotation of said drive member whereby upon movement of the roll carrier in the reverse direction the roll is moved by said pin out of driving position, spring means associated with said roll carrier urging said roll toward said pin and urging the roll carrier in a direction to move the roll into driving position, a control arm arranged upon movement in one direction to move said roll carrier and roll against the action of said spring means out of driving position, said roll carrier having a shoulder in its periphery engaged by said control arm when the arm is moved in said one direction, a spring connected to said arm for moving the arm in said one direction, a lever on which said arm is carried, and a cam on said roll carrier acting on said lever to move the lever and the arm against the action of said spring and to release the lever and arm at a predetermined point in the rotation of said drive member.

References Cited in the file of this patent

UNITED STATES PATENTS

| | | |
|---|---|---|
| 503,311 | Dahl | Aug. 15, 1893 |
| 1,578,370 | Ross | Mar. 30, 1926 |
| 2,140,737 | Dickens | Dec. 20, 1938 |